United States Patent
Kupferschmidt et al.

(10) Patent No.: US 8,937,985 B2
(45) Date of Patent: Jan. 20, 2015

(54) METHOD FOR WIRELESSLY TRANSMITTING DATA BETWEEN A PLURALITY OF COMMUNICATION UNITS ARRANGED IN A ROTATING COMPONENT AND ROTATING COMPONENT

(75) Inventors: Claus Kupferschmidt, Cuxhaven (DE); Amina Ayadi-Miessen, Barsinghausen (DE); Feng Zheng, Duisburg (DE)

(73) Assignee: Telemetrie Elektronik GmbH, Langenhagen (DE)

( * ) Notice: Subject to any disclaimer, the term of this patent is extended or adjusted under 35 U.S.C. 154(b) by 172 days.

(21) Appl. No.: 13/390,262

(22) PCT Filed: Aug. 10, 2010

(86) PCT No.: PCT/EP2010/004877
§ 371 (c)(1),
(2), (4) Date: Feb. 13, 2012

(87) PCT Pub. No.: WO2011/018204
PCT Pub. Date: Feb. 17, 2011

(65) Prior Publication Data
US 2012/0140795 A1 Jun. 7, 2012

(30) Foreign Application Priority Data
Aug. 14, 2009 (DE) .......................... 10 2009 037 335

(51) Int. Cl.
*H04B 1/00* (2006.01)
*H04B 1/719* (2011.01)
*H04B 1/7183* (2011.01)

(52) U.S. Cl.
CPC .............. *H04B 1/719* (2013.01); *H04B 1/7183* (2013.01)

USPC ........................................................ 375/146

(58) Field of Classification Search
USPC ......... 375/130, 138, 140, 260, 267, 279, 285, 375/295, 308
See application file for complete search history.

(56) References Cited

U.S. PATENT DOCUMENTS

| 7,263,133 | B1* | 8/2007 | Miao ............................. 375/267 |
| 2003/0227980 | A1* | 12/2003 | Batra et al. ..................... 375/295 |
| 2005/0195883 | A1* | 9/2005 | Choi et al. ..................... 375/130 |
| 2007/0256485 | A1 | 11/2007 | Rensel et al. |
| 2007/0276538 | A1 | 11/2007 | Kjellsson et al. |

(Continued)

FOREIGN PATENT DOCUMENTS

EP        1843011  A2   10/2007

OTHER PUBLICATIONS

International Preliminary Report on Patentability of the European Patent Office in Application No. PCT/EP2010/004877, dated Feb. 28, 2012.

(Continued)

*Primary Examiner* — Khanh C Tran
(74) *Attorney, Agent, or Firm* — Kinney & Lange, P.A.

(57) ABSTRACT

A method for the wireless transmission of data between at least one communication unit (2) which is arranged in or on a rotatable part (1) and to which at least one sensor (S) and/or actuator is respectively connected, and at least one base communication unit (4) which is arranged in radio reception range outside of the rotatable part is described. Transmission of the data using the ultrawideband radio transmission method (UWB) on a frequency spectrum of more than 500 MHz or a frequency bandwidth of more than 0.2 times the average transmission frequency is proposed.

13 Claims, 3 Drawing Sheets

(56) References Cited

U.S. PATENT DOCUMENTS

| | | | |
|---|---|---|---|
| 2007/0286311 A1* | 12/2007 | Coyne et al. | 375/340 |
| 2009/0046774 A1 | 2/2009 | Abou Rjeily | |
| 2009/0115629 A1* | 5/2009 | Duffy et al. | 340/870.07 |
| 2010/0278214 A1* | 11/2010 | Westcott et al. | 375/130 |

OTHER PUBLICATIONS

Ayadi-Miessen et al., "A method of Channel Measurement based on MB-OFDM Signal," IEEE International Conference on Ultra-Wideband (ICUWB2008), vol. 2, Sep. 2008.

Tsang et al., "Ultra-Wideband (UWB) Communications Systems: An Overview," The 3rd International IEEE_NEWCAS Conference, Jun. 2005.

Kupferschmidt, "Modellierung zyklisch stationärer Kanäle für die funkgestützte Rotortelemetrie," Dissertation, Nov. 28, 1969.

International Search Report of the European Patent Office in Application No. PCT/EP2010/004877, dated Oct. 26, 2010.

* cited by examiner

METHOD FOR WIRELESSLY TRANSMITTING DATA BETWEEN A PLURALITY OF COMMUNICATION UNITS ARRANGED IN A ROTATING COMPONENT AND ROTATING COMPONENT

BACKGROUND

The invention relates to a method for the wireless transmission of data between at least one communication unit, which is arranged in or on a rotatable part and to which at least one sensor (S) and/or actuator is respectively connected, and at least one base communication unit which is arranged in radio reception range outside of the rotating part.

The invention also relates to a rotatable part having at least one communication unit for the wireless transmission of data between the at least one communication unit and at least one base communication unit which is arranged in radio reception range outside of the rotating part.

In rotor telemetry, sensors capture measurement data for physical parameters, such as pressure, temperature or vibration, on predominantly rotating parts. These parameters are emitted in the form of data in a transmission signal by means of special communication units which are mounted in or on the rotatable part and which are provided with moving antennas, and are received and evaluated by static antennas on at least one base communication unit which are arranged in radio reception range at the perimeter of the rotatable part. Owing to rising demands on transmission systems with rotor telemetry in terms of greater flexibility and a higher data rate, the transmitters and receivers are increasingly being implemented in digital form.

The known digital radio-assisted systems in rotor telemetry are based on narrowband, low-rate single-carrier methods, which have a limited data rate for a frequency channel.

One such telemetry module for a rotating part is known from EP 1 843 011 A2, for example.

Claus W. Kupferschmidt: Modellierung zyklisch stationärer Kanäle für die funkgestützte Rotortelemetrie [Modeling of cyclically steady channels for radio-assisted rotor telemetry], Hannoversche Beiträge zur Nachrichtentechnik, 1st edition, 09/2007, Shaker-Verlag publishers, describes the conventional methods for data transmission which are used for rotor telemetry, all of which use modulation onto a radio-frequency carrier. When a central radio-frequency carrier of this kind is used, a high data rate in the transmitter results in a reduced symbol duration. The effects of multipath propagation become ever more problematic when symbols are shortened. If the dispersion of the radio channel is in the order of magnitude of the symbol duration or distinctly above it, the transmission quality is disrupted by heavy symbol interference. This sometimes requires complex signal equalization.

In this case, the datastreams can be transmitted using a plurality of low-rate radio-frequency carriers, as a result of which the symbol duration per carrier can be significantly greater than the dispersion of the radio channel. Although this counteracts heavy symbol interference, a multi-radio-frequency-carrier solution of this kind involves a proportional increase in the circuit complexity for the rotor-based communication units as the number of different radio-frequency carriers used increases.

SUMMARY

Against this background, it is an object of the present invention to provide an improved method for wireless transmission between a plurality of communication units which are arranged in or on a rotatable part, which method can be implemented as inexpensively and technically simply as possible and allows high data rates for a multiplicity of communication units and sensors and/or actuators connected thereto.

The object is achieved by the method of the type cited at the outset by transmission of the data using the ultrawideband radio transmission method on a frequency spectrum of more than 500 MHz or a frequency bandwidth of more than 0.2 times the average transmission frequency.

According to the present invention, the ultrawideband technology (UWB) is used for the rotor telemetry. In this case, the data are transmitted on a wideband basis without modulation onto a specific carrier frequency.

It has been found that the UWB data transmission technology does not adversely affect the data transmission, despite the frequency-dependent Doppler shift on account of the rotation of the part. The frequency-dependent Doppler effect results in a correctable Doppler shift and in a Doppler broadening which does not have a disruptive effect given suitable system configuration.

Ultrawideband technology is suitable for the rotor telemetry particularly because it supports only low powers and short transmission paths. The short impulses required for impulse data transmission, for example, require only low transmission powers, which can easily be introduced by induction into the rotating element and the communication units arranged therein.

In addition, UWB data transmission technology has the advantage over conventional narrowband telemetry systems that the transmission is less severely influenced by narrowband inband interference sources, since only a small frequency range of the UWB useful signal is disrupted. Such interference can come from mobile radios or WLAN systems, for example.

In addition, ultrawideband technology has the advantage that it is possible to use a large number of similar communication units in a rotatable part which all have the same transmitter design. The data from a multiplicity of sensors can then be transmitted, by means of at least one communication unit, to a single base communication unit almost simultaneously, e.g. by using a timeslot method or sensor-dependent coding, e.g. with a spreading method, or a combination thereof.

It is particularly advantageous if the data which are to be transmitted are subjected to pulse position modulation in communication units by emitting an impulse, preferably without modulation onto a carrier frequency, using a time offset from a respective impulse reference time, which time offset is chosen on the basis of the piece of information to be transmitted. It is therefore proposed that what is known as the impulse radio method be used, in which the UWB data transmission is implemented using successive very short impulses in an order of magnitude of one or more nanoseconds, for example. Such impulses can be generated very efficiently in terms of circuitry and energy, e.g. by an analog diode circuit. The transmission unit of the communication units integrated in a rotatable part can therefore be miniaturized, which is of great significance for the industrial application of rotor telemetry.

It is alternatively conceivable to use direct-sequence pulse amplitude modulation (DS-PAM), in which the information which is to be sent is multiplied by a spread code and is emitted after having undergone pulse amplitude modulation.

Alternatively, the UWB data transmission can be effected using multiband orthogonal frequency division multiplex transmission (multiband OFDM=multiband orthogonal frequency division multiplexing) by virtue of the data to be transmitted being coded and transmitted in parallel by virtue of modulation in the phases of a plurality of sinusoidal subcarriers.

In this case, it is advantageous for the data from a plurality of sensors to be sequentially distributed over the plurality of subcarriers. This distribution can be effected on the basis of a firmly prescribed or random scheme.

Alternatively, the UWB data transmission can be effected by direct-sequence code division multiple access transmission (direct-sequence code division multiple access, DS-CDMA) by virtue of the data which are to be transmitted or the information which is to be sent being multiplied by a firmly prescribed or pseudo-random spread code. The information to be sent is usually binary data signals from the plurality of sensors which are multiplied by suitable spread codes. By way of example, the result can be modulated by means of pulse amplitude modulation onto the UWB pulses, and these modulated pulses can be emitted. The maximum number of different sensors is determined by the number of available spread codes. In this case, the transmission quality is dependent on the necessary data rate and the signal-to-noise ratio (SNR) which is to be expected at the reception end.

It is advantageous if the electrical power for supplying power to the communication units is coupled inductively. In this case, it is possible to reduce the complexity for the communication units and the sensors and/or actuators which may be connected thereto or integrated therein, since there is no need for a separate power supply which has to be integrated into the rotatable part.

Particularly at very high revolutions, the rotating part may result in Doppler shifts in the individual useful frequencies on account of the rotation speeds. These are frequency-dependent, which means that for ultrawideband radio transmission it is advantageous to determine these frequency-dependent Doppler shifts for frequencies in the frequency spectrum on the basis of the speed of revolution of the rotating part and to compensate for the Doppler shifts in the received signal by means of suitable algorithms, tables or correlators with downstream filters. By way of example, the frequency-dependent Doppler shift can be determined by estimation, particularly using a plurality of correlators. In this case, each correlator can calculate a cross ambiguity function for an assumed Doppler shift, for example, i.e. using a cross correlation. The maximum for these correlators provides a rough estimate for the Doppler shift.

It is possible to compensate for the Doppler shifts using interpolation filters parameterized on the basis of frequency and/or using phase locked loops, for example.

It is particularly advantageous if each sensor is assigned an individual code sequence for the purpose of stipulating transmission timeslots, and a comparison signal is provided for the purpose of correlation with the received data transmission signal by delaying the individual code sequences on the basis of the known data transmission path for the known data transmission path delays. By separating the plurality of sensors by means of their code sequences, which are known to the transmitter and the receiver, it is possible to distinguish the signals from the individual sensors in the receiver of the common base communication unit from one another. However, this requires estimation of the transmission channel so that the path attenuations and path delays become known.

It is also an object of the invention to provide an improved rotatable part having at least one communication unit, to which at least one sensor or actuator is respectively connected, for the wireless transmission of data between the at least one communication unit and at least one base communication unit which is arranged in radio reception range outside of the rotating part, which part allows fast transmission of large volumes of data from a multiplicity of communication units to the at least one base communication unit.

The object is achieved with the rotatable part of the type cited at the outset by virtue of the communication units being designed to transmit the data using the ultrawideband radio transmission method on a frequency spectrum of more than 500 MHz or a frequency bandwidth of more than 0.2 times the average transmission frequency according to the method described above.

Advantageous embodiments are described in the subclaims.

BRIEF DESCRIPTION OF THE DRAWINGS

The invention is explained in more detail below using exemplary embodiments with reference to the appended drawings, in which.

DETAILED DESCRIPTION

Figure 1:
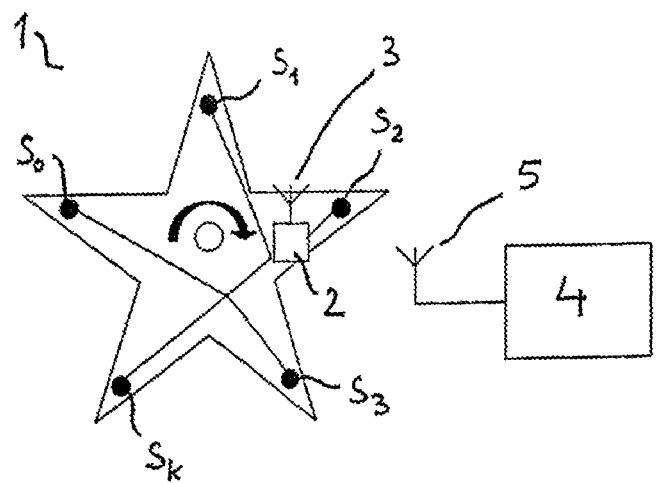
FIG. 1 shows an outline of a rotatable part with communication units and a static base communication unit.

FIG. 1 shows an outline of a rotatable part 1 with a communication unit 2 arranged thereon which are connected to or contain sensors S and/or actuators fitted in or on the rotatable part 1. The at least one communication unit 2 has a respective dedicated antenna 3. If the plurality of communication units 2 are present, these may sometimes also share a common antenna (not shown). The at least one communication unit 2 is used to interchange data unidirectionally or bidirectionally with at least one base communication unit 4. Such data may be particularly measurement data from sensors S which are connected to a communication unit 2. Alternatively, it is conceivable for control data for the purpose of actuating actuators to be sent from the base communication unit 4 to the communication unit 2 which is connected to the actuator to be actuated. The base communication unit 4 has at least its antenna 5 arranged in radio reception range.

In order to be able to use a high data rate to transmit a large volume of data from a multiplicity of sensors S, the communication units 2 and the base communication unit 4 are set up to perform data transmission using the ultrawideband radio transmission method (UWB). The ultrawideband radio transmission method involves the use of a frequency spectrum for data transmission of more than 500 MHz or a frequency bandwidth of more than 0.2 times the average transmission frequency. The relative bandwidth, i.e. the ratio of absolute bandwidth to average frequency, is therefore confined to a value of at least 0.2. The absolute bandwidth is at least 500 MHz.

For wireless data transmission when using radio-assisted rotor telemetry, an energy-saving UWB-based transmission system is therefore used, in which a dedicated frequency band is not engaged. On the contrary, the ultrawideband radio transmission methods can use already allocated frequency bands and form what is known as an "overlay" system. This is possible without serious interference, since in typical application scenarios the power density spectrum of received UWB signals is lower than the background noise. The value of the maximum spectral transmission power density is normally below the maximum admissible spurious radio from electrical appliances. Since the data transmission is not dependent on one or more carrier frequencies onto which the transmitting data are modulated, only a single UWB antenna is required for all communication units.

Figure 2:
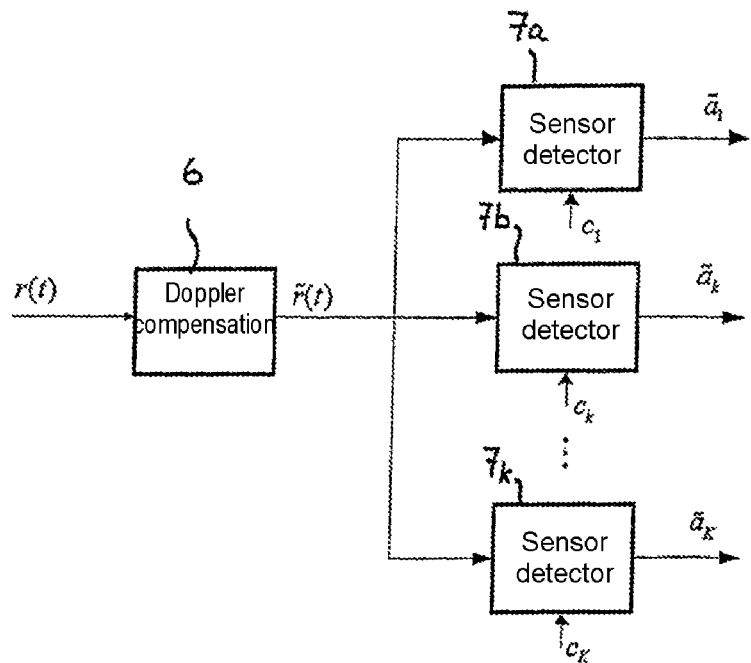
FIG. 2 shows a block diagram of a receiver structure in a base communication unit.

FIG. 2 shows a block diagram of a detail from a base communication unit 4. The parts required for receiving the radio signals, such as antenna and preamplifier, are not shown.

The received signal r(t) is subjected to Doppler compensation in a Doppler compensation unit 6. This involves eliminating the Doppler shifts, caused by the rotation speeds, in the individual user frequencies of the received signal r(t). The frequency-dependent Doppler shift results in a deviation which behaves in the manner of a sampling clock error in the received signal r(t). In order to compensate for the Doppler shift, it is first of all estimated in the Doppler compensation unit 6. This can be done using a method based on a plurality of correlators. Each correlator can calculate a cross ambiguity function for an assumed Doppler shift, for example. The maximum from these correlators provides a rough estimate for the Doppler shift. The broad Doppler shift can be compensated for using interpolation filters, for example. Similarly, a phase locked loop PLL can be used to compensate for the residual Doppler error.

Since the same transmission channel is used and a transmission frequency is not stipulated for each communication unit 2 or each sensor S connected to a communication unit 2, the signals from all sensors S are overlaid at the receiver, i.e. the base communication unit 4, in order to form an overlaid received signal r(t). This can be expressed as follows by the function below:

$$r(t) = \sum_{k=1}^{K} r_k(t). \quad (1)$$

The index K is the number of communication units 2 or the number of sensors S connected to a communication unit 2.

The base communication unit 4 has a number K of sensor detectors 7a, 7b, . . . , 7K which ascertains the individual received symbols $\tilde{a}_k$ from the k-th sensor S or the k-th communication unit 2 from the common received signal $\tilde{r}(t)$ corrected in respect of the Doppler effect. The detection of the received symbols $\tilde{a}_k$ is dependent on the modulation methods of the ultrawideband radio transmission method UWB which are specifically used by the individual communication units 2. In this case, UWB technology provides different options, two of which are explained by way of example below.

Figure 3:
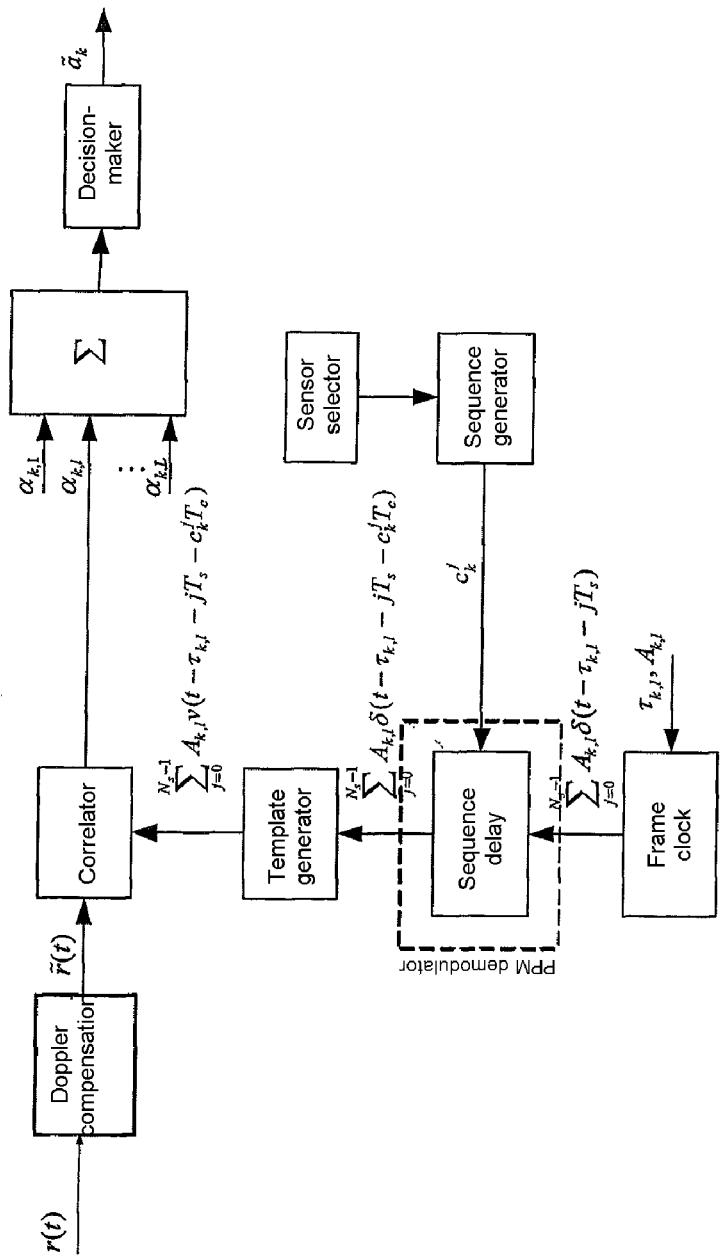
FIG. 3 shows a block diagram of a sensor detector in a base communication unit for the time-hopping pulse position modulation method (TH-PPM)

FIG. 3 shows an embodiment of a sensor detector 7 in a base communication unit for the time-hopping pulse position modulation method TH-PPM. This method is based on impulse radio technology, in which successive very short impulses in the order of magnitude of one nanosecond are used. These impulses can be generated in the transmitter of the communication units 2 very efficiently in terms of circuitry and energy, for example by an analog diode circuit. Since the impulses last a very short amount of time, the digital information from the individual sensors S can be determined by the position of the pulses.

In the TH-PPM method, the transmitting signal from the k-th communication unit 2 is defined by:

$$s_k(t) = \sum_{j=-\infty}^{\infty} \omega_s(t - jT_s - c_k^j T_c - \varepsilon a_k^j), \quad (2)$$

where $\omega_s(t)$ is the transmitted impulse with duration $T_\omega$, and $N_s$ is the number of transmitting impulses per frame. $T_s$ is the frame duration, $T_c$ is the chip duration. As a result, $$T_s = N_c * T_c, \quad (3)$$

where $N_c$ is the number of chips per frame. $\alpha_k$ describes the bit sequence $\alpha_k \in \{-1,1\}$ and $\varepsilon$ describes the modulation constant.

Following the transmission via the air interface between rotor and stator, the received signal from the k-th sensor S is overlaid as follows by means of the multipath transmission:

$$r_k(t) = \sum_{l=1}^{L} A_{k,l} \sum_{j=-\infty}^{\infty} \omega_r(t - jT_s - c_k^j T_c - \varepsilon a_k^j - \tau_{k,l}) + n(t), \quad (4)$$

where $\omega_r(t)$ is the received impulse, the shape of which has changed by virtue of the transmission and reception antenna. $A_{k,l}$ and $\tau_{k,l}$ are respectively the path attenuations and path delays of the channel, L is the number of paths and n(t) is the additive white noise.

At the receiver, the signals from all sensors S are overlaid:

$$r(t) = \sum_{k=1}^{K} r_k(t). \quad (5)$$

The proposed method involves the individual communication units 2 or sensors S being separated from one another by their code $c_k$. The codes $c_k$ are known to the transmitter and the receiver and are used by the receiver to distinguish the individual sensors S and possibly the individual communication units 2. In principle, the codes $c_k$ are used to stipulate the times at which the individual sensors S transmit messages. In order to distinguish the individual sensors S, the channel needs to be estimated so that the path attenuations $A_{k,l}$ and the path delays $\tau_{k,l}$ become known. To this end, the received signal $\tilde{r}(t)$ is correlated with the customized template signal v(t). This is accomplished for each path l of the channel for all frames on the basis of the rule:

$$\alpha_{k,l} = \sum_{j=0}^{N_s-1} \int_{\tau_{k,l}+jT_s}^{\tau_{k,l}+(j+1)T_s} A_{k,l} r(t) v(t - \tau_{k,l} - jT_s - c_k^j T_c) dt. \quad (6)$$

Next, the coefficients $\alpha_{k,l}$ from the strongest l paths are added. Downstream of a decision-maker, the received symbol $\tilde{a}_k$ from the k-th sensor S is ascertained.

The Doppler compensation unit 6 estimates and compensates for the Doppler shift. The sensor selector then selects the information from a particular communication unit 2 or from a particular sensor S connected to a common communication unit 2 or assigns the information to the individual sensors S. This is done by using a sequence generator which generates the code $c_k^j$ from the k-th sensor S in the j-th frame. The frame clock is generated as a weighted and delayed impulse train, for example. A PPM demodulator or a sequence delay is used to delay the impulse train by $c_k^j T_c$. A template generator filters the input impulse train using the template signal v(t).

The correlator multiplies the received signal r(t) by the overlaid delayed template signal and performs integration over a frame duration. A summation section is used to add all coefficients $\alpha_{k,l}$ over L channel paths. A decision-maker uses a threshold to decide which symbol has been sent.

Figure 4:
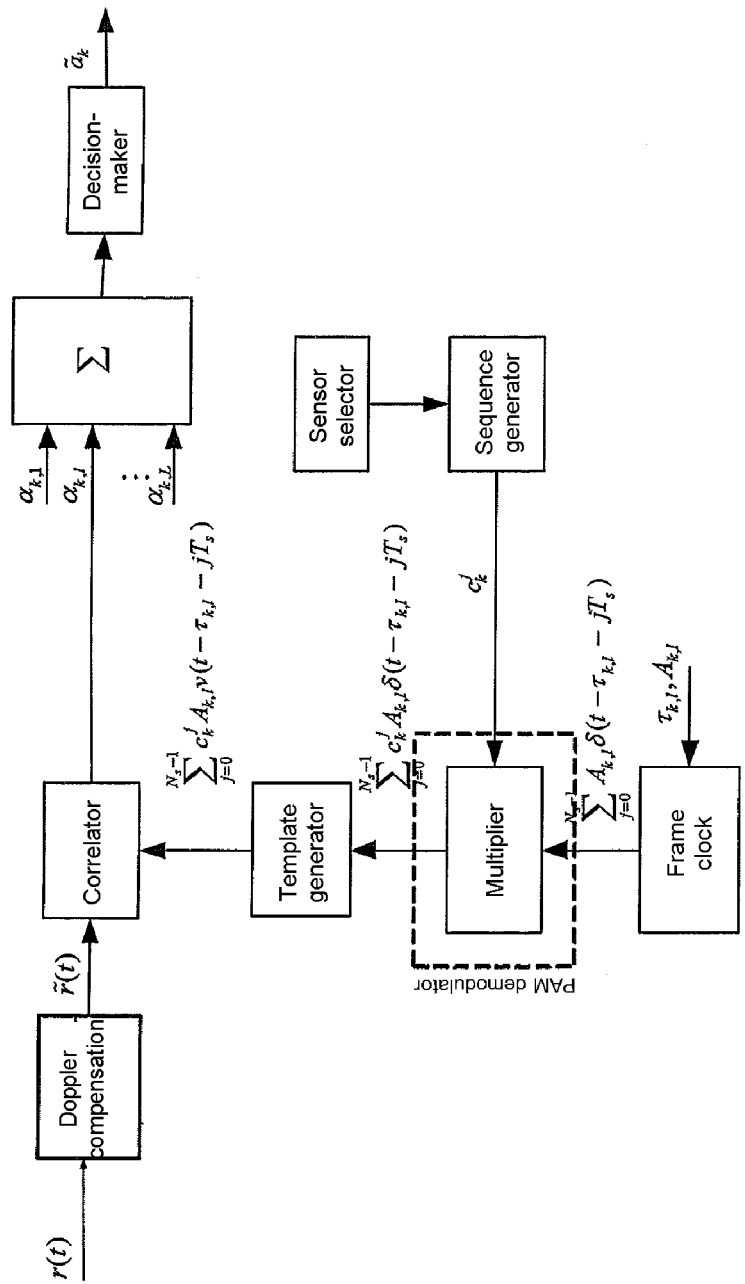
FIG. 4 shows a block diagram of a sensor detector in a base communication unit for the direct-sequence pulse amplitude modulation method (DS-PAM).

FIG. 4 shows a block diagram of a sensor detector in a base communication unit for the direct-sequence pulse amplitude modulation method (DS-PAM). The transmitting signal from the k-th sensor S is defined by:

$$s_k(t) = \sum_{j=-\infty}^{\infty} d_k^j \omega_s(t - jT_s), \quad (7)$$

where $d_k^j = a_k^j c_k^j$ represents the spread signal. In a similar manner to the PPM-modulated signal, the received signal is disrupted by multipath propagation and noise in the DS-PAM method, as described by means of the aforementioned equation (2). At the receiver, all signals from the sensors S are overlaid in accordance with equation (3) described above.

Sensor detection is performed in a manner similar to in the case of the TH-PPM method described above. The essential difference lies in the demodulation. The fundamental structure of the receiver is the same as shown in FIG. 2.

The template signal v(t) is distinguished by a different influence by the code $c_k^j$ from the k-th sensor S on the basis of the spread code. From the above-described template signal from the TH-PPM.

The coefficients $\alpha_{k,l}$ in the DS-PAM method are defined as follows for the k-th sensor S:

$$\alpha_{k,l} = \sum_{j=0}^{N_s-1} \int_{\tau_{k,l}+jT_s}^{\tau_{k,l}+(j+1)T_s} c_k^j A_{k,l} r(t) v(t - \tau_{k,l} - jT_s) dt. \quad (8)$$

Next, the coefficients $\alpha_{k,l}$ from the strongest L paths are added. Downstream of a decision-maker, the received symbol $\tilde{a}_k$ from the k-th sensor S is ascertained.

The task of the communication units 2 is very simple in comparison with scaled narrowband systems. The method is additionally distinguished by a significantly higher data rate (for example 30 times that of scaled narrowband systems) and a relatively low power consumption. The method described also has very high immunity toward inband interference sources on account of the bandwidth diversity. The low transmission power also makes it possible to ensure that other radio systems are not disturbed.

The invention claimed is:

1. A method for the wireless communication of data between at least one communication unit, which is arranged in or on a rotatable part and to which at least one sensor and/or actuator is respectively connected, and at least one base communication unit which is arranged in radio reception range outside of the rotatable part, comprising determination of frequency-dependent Doppler shifts for frequencies in the frequency spectrum on the basis of the speed of revolution of the rotatable part, transmission of the data using the ultrawideband radio transmission method (UWB) on a frequency spectrum of more than 500 MHz or a frequency bandwidth of more than 0.2 times an average transmission frequency, and compensation for the determined Doppler shifts in a received signal.

2. The method as claimed in claim 1, comprising pulse position modulation (TH-PPM) of the data which are to be transmitted, such that an impulse is emitted, without modulation onto a carrier frequency, using a time offset from a respective impulse reference time, which time offset has been chosen on the basis of a piece of information which is to be transmitted.

3. The method as claimed in claim 1, comprising direct-sequence pulse amplitude modulation (direct-sequence PAM) of the data which are to be transmitted, such that the data which is to be sent is multiplied by a spread code and is emitted after having undergone pulse amplitude modulation.

4. The method as claimed in claim 1, comprising multiband orthogonal frequency division multiplexing transmission on a plurality of frequency bands (multiband OFDM) for the data, such that data are coded and transmitted in parallel by virtue of modulations in the phases of a plurality of sinusoidal subcarriers.

5. The method as claimed in claim 4, comprising sequential distribution of the data from the sensors associated with the communication unit over the plurality of subcarriers.

6. The method as claimed in claim 1, comprising direct-sequence code division multiple access transmission (direct-sequence CDMA) of the data which are to be transmitted, such that the data which is to be sent is multiplied by a spread code.

7. The method as claimed in claim 1, comprising inductive coupling of electrical power for supplying power to the communication units.

8. The method as claimed in claim 1, wherein the frequency-dependent Doppler shifts are determined by estimation, particularly using correlators.

9. The method as claimed in claim 1, comprising compensation for the Doppler shifts using interpolation filters parameterized on the basis of frequency and/or using phase locked loops.

10. The method as claimed in claim 1, wherein each sensor associated with a common communication unit is assigned an individual code sequence ($C_K$) and wherein a comparison signal is provided for the purpose of correlation with the received data transmission signal by delaying the individual code sequences on the basis of known data transmission path attenuations and data transmission path delays.

11. A rotatable part having at least one communication unit, to which at least one sensor and/or actuator is respectively connected, for the wireless transmission of data between the at least one communication unit and at least one base communication unit which is arranged in radio reception range outside of the rotating part, wherein the communication units are designed to transmit the data using the ultrawideband radio transmission method (UWB) on a frequency spectrum of more than 500 MHz or a frequency bandwidth of more than 0.2 times the average transmission frequency according to the method as claimed in claim 1.

12. The rotatable part as claimed in claim 11, wherein the communication units are each connected to sensors fitted in the rotatable part, wherein data to be transmitted represent measurement data ascertained by the sensors.

13. The rotatable part as claimed in claim 11, wherein the communication units are each connected to actuators fitted in the rotatable part, wherein data to be transmitted represent control commands for the actuators.

\* \* \* \* \*